March 27, 1934.    O. E. TRAUTMANN ET AL    1,952,224
FIELD GLASS
Filed Dec. 15, 1930
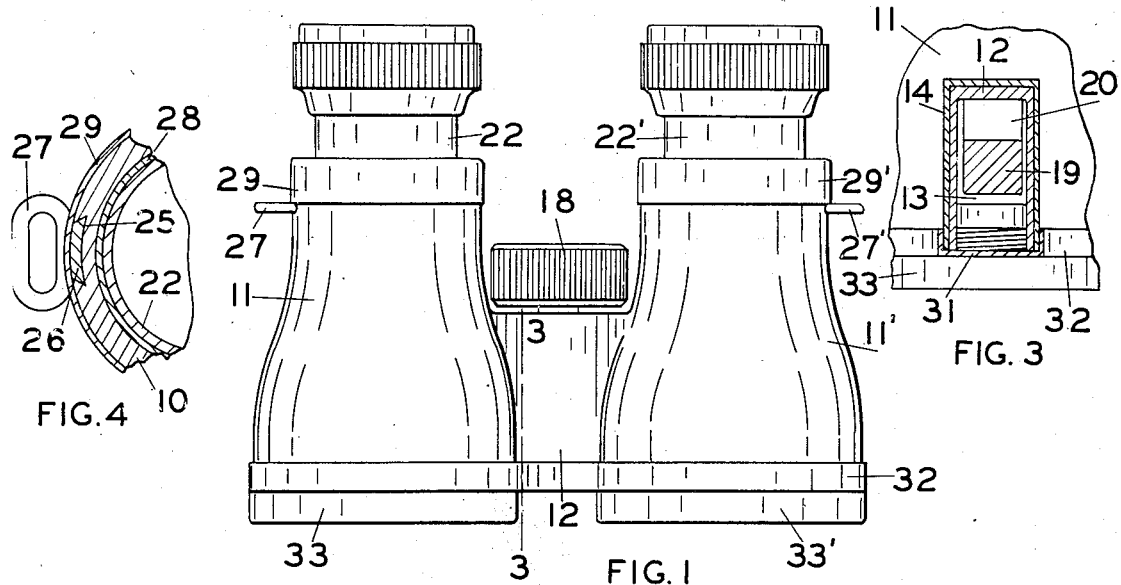
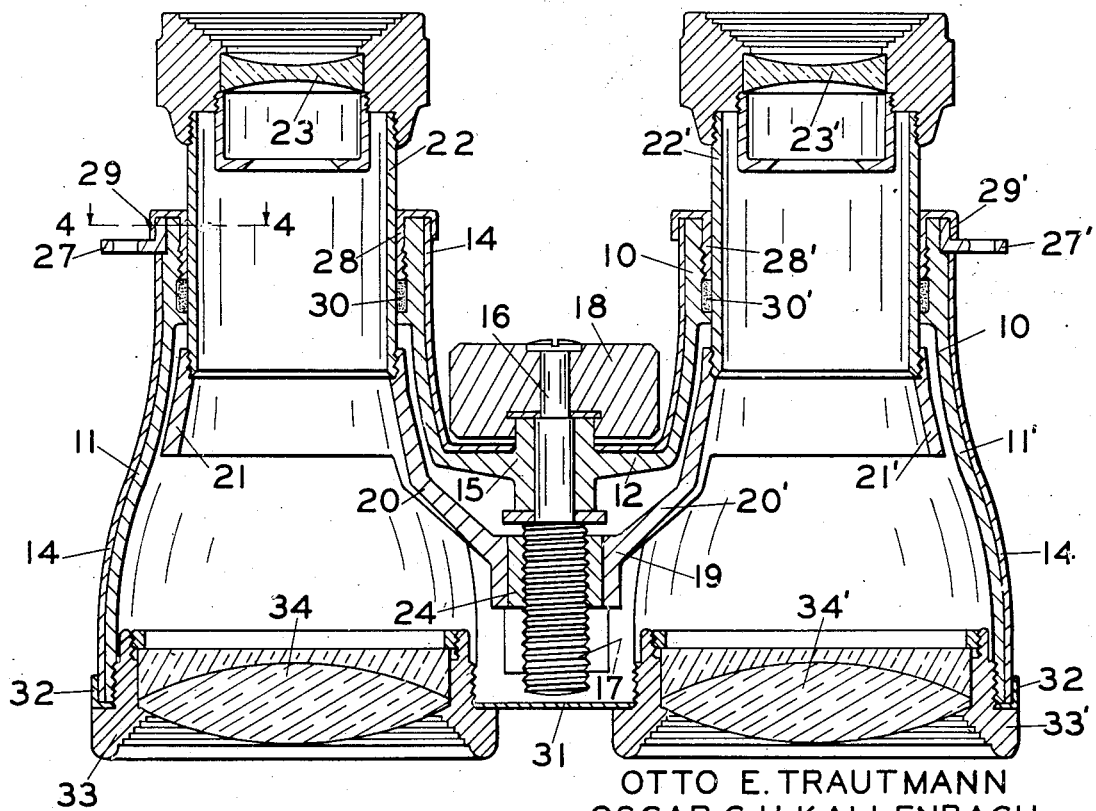
OTTO E. TRAUTMANN
OSCAR G. H. KALLENBACH
*INVENTORS*
BY  *J. A. Ellestad*
*ATTORNEY*

Patented Mar. 27, 1934

1,952,224

UNITED STATES PATENT OFFICE 1,952,224

FIELD GLASS

Otto E. Trautmann and Oscar G. H. Kallenbach, Rochester, N. Y., assignors to Bausch & Lomb Optical Company, Rochester, N. Y., a corporation of New York Application December 15, 1930, Serial No. 502,466

4 Claims. (Cl. 88—34)

This invention relates to optical instruments and more particularly it has reference to devices known as field glasses or binoculars.

One of the objects of our invention is to provide an improved field glass which will be relatively simple in structure though efficient and convenient in operation. Another object is to provide a field glass which can be easily and cheaply manufactured and assembled. Still another object is to provide a field glass with improved means for adjusting the eye pieces or oculars for the purpose of focusing. These and other objects and advantages reside in certain novel features of construction, arrangement and combination of parts as will hereinafter be more fully described and pointed out in the appended claims.

Referring to the drawing:

Fig. 1 shows a front elevation of our improved field glass.

Fig. 2 is an enlarged vertical sectional view of the same.

Fig. 3 is a sectional view taken on line 3—3 of Fig. 1.

Fig. 4 is a sectional view taken on line 4—4 of Fig. 2.

Similar reference characters refer to similar parts throughout the several views of the drawing.

A preferred embodiment of our invention is shown in the drawing wherein 10 indicates, generally, the casing of the instrument. The casing 10 is preferably formed of a single, integral casting and comprises the two spaced barrel portions 11 and 11' which are connected by an integral bridge member 12 which has the slot 13 so that the bridge member 12 has an inverted U-shape, as shown in Fig. 3. The entire casing, including barrel portions 11 and 11' and the bridge member 12 may be covered by a layer of material, indicated at 14, such as leather, vulcanized rubber or any other suitable material which may be applied in any desired manner.

The bridge member 12 has an integral, apertured boss 15 within which is rotatably mounted the rod 16 having a screw portion 17 at its lower end and a knurled knob or finger piece 18 fixedly secured to its upper end. A yoke 19 has the two diverging arms 20 and 20' which extend upwardly, through the slot 13, and into the barrel portions 11 and 11', respectively. The two arms 20 and 20' terminate, respectively, in the two circular bushing portions 21 and 21' which are threaded to receive the oculars or eye piece tubes 22 and 22' carrying the lenses 23 and 23'. The yoke 19 has a threaded portion 24 which cooperates with screw 17 so that the oculars may be adjusted for focusing by turning the knob 18.

At the top of each barrel portion a dove-tailed groove 25 is formed in the side wall to receive a correspondingly shaped projection 26 on the apertured member 27. Rings 28 and 28', threaded to the inner walls of the barrel portions, have the overhanging flanges 29 and 29' which abut against the members 27 and 27' and serve to keep the latter in place. The apertured members 27 and 27' thus afford convenient means for attaching a shoulder strap to the field glass. The cloth rings 30 and 30', held in place by rings 28 and 28', serve to keep dust from getting into the barrels.

A plate 31, having an upturned peripheral flange 32, covers the under side of the U-shaped bridge member. The plate 31 is held against the lower ends of the two barrel portions by mountings 33 and 33' which are threaded into the lower ends of the barrels and carry the two objective lenses 34 and 34', respectively.

From the foregoing, it will be apparent that we are able to attain the objects of our invention and provide an improved and efficient type of field glass. The casing is preferably formed of a single, integral casting of a metal such as aluminum. The yoke member is also preferably formed of an integral aluminum casting. The yoke carrying the two oculars is supported at a single point, namely on screw 17, and hence if the yoke is rocked laterally about this point, the ocular tubes strike the inside of rings 28 and 28' and find a bearing surface thereon. Therefore it is not necessary, in manufacturing, to exercise great care to insure a perfect sliding fit for the ocular tubes in order to keep them centered and still the field glass will function in a highly satisfactory manner. The shoulder strap loops 27 and 27' are secured directly to the casing of the instrument and hence afford a rigid support. The exposed screw heads have been reduced to a minimum; the lens barrels are practically dust-proof; the instrument is nicely balanced and can be easily held and focused with one hand and the structure is durable and presents a neat appearance. Various modifications can obviously be made without departing from the spirit of our invention.

We claim:

1. In a field glass, the combination of a casing wall having a dove-tail groove formed therein, an apertured member having a projection which cooperates with said groove, a ring threadedly secured to said wall, said ring having a depending flange abutting against said member.

2. A field glass comprising two lens barrels connected by a bridge member, said barrels and bridge being a single integral structure, said bridge member being disposed approximately mid-way between the top and bottom of said barrels, a bearing carried by said bridge member, a shaft rotatably carried therein, said bearing constituting the sole support of the said shaft, a screw carried by the lower end of said shaft, an operating knob carried by the upper end, an objective lens carried by each of said barrels, a yoke having two diverging arms extending upwardly into said barrels, a bushing member carried by each of said arms, and an ocular mounted in each of said bushings, said yoke having a threaded portion cooperating with said screw whereby said oculars may be adjusted.

3. A field glass comprising a casing having two spaced barrel portions connected by and integral with a bridge member, an objective lens fixedly secured to each of said barrel portions, an elongated yoke mounted within said casing, said yoke having a threaded portion adjacent said bridge member and an arm extending upwardly from said threaded portion into each of said barrel portions, a shaft carrying screw means at its lower end and an operating knob at its upper end, and carried solely by said bridge portion, for moving said yoke and an ocular tube and lens secured to each arm of said yoke, the axis of the shaft and screw being located in the same plane as the axes of the barrels.

4. A field glass comprising a casing having two spaced barrel portions and a bridge member integral therewith and connecting said portions, a boss on said member, said boss having a bore, a shaft rotatably mounted in said bore and supported solely by said boss, a screw on one end of said shaft, below the boss, an operating knob on the other end of the shaft, above the boss, an objective lens carried by each of said barrel portions, a screw-threaded yoke mounted on said screw, said yoke having elongated diverging arms extending upwardly into said barrel portions, each of said arms having a bushing and an ocular carried by each of said bushings.

OTTO E. TRAUTMANN.
OSCAR G. H. KALLENBACH.